US012737394B2

(12) United States Patent
Haikin et al.

(10) Patent No.: US 12,737,394 B2
(45) Date of Patent: Sep. 15, 2026

(54) METHODS AND SYSTEMS FOR GENERATING TAXONOMY ANALYTICS FOR ASPECTS OF CONTACT CENTER INTERACTIONS

(71) Applicant: GENESYS CLOUD SERVICES, INC., Menlo Park, CA (US)

(72) Inventors: Lev Haikin, Tel-Aviv (IL); Nelly David, Tel-Aviv (IL); Eyal Orbach, Tel-Aviv (IL); Avraham Faizakof, Tel-Aviv (IL)

( * ) Notice: Subject to any disclaimer, the term of this patent is extended or adjusted under 35 U.S.C. 154(b) by 155 days.

(21) Appl. No.: 18/441,701

(22) Filed: Feb. 14, 2024

(65) Prior Publication Data

US 2025/0258850 A1 Aug. 14, 2025

(51) Int. Cl.
*G06F 16/3329* (2025.01)
*G06F 16/353* (2025.01)

(52) U.S. Cl.
CPC ........ *G06F 16/3329* (2019.01); *G06F 16/353* (2019.01)

(58) Field of Classification Search
CPC ........................... G06F 16/3329; G06F 16/353
See application file for complete search history.

(56) References Cited

U.S. PATENT DOCUMENTS 10,067,987 B1 * 9/2018 Khanna .................. G06F 16/44
2017/0278514 A1 9/2017 Mathias et al.
2020/0159991 A1 * 5/2020 Chittari ................. H04L 51/216
2022/0070296 A1 * 3/2022 Friio ...................... H04L 51/02
2023/0351257 A1 11/2023 Mourya et al.
2024/0419738 A1 * 12/2024 Sharma ................... G06F 16/93
2025/0252254 A1 * 8/2025 Gao .................... H04M 3/5175

FOREIGN PATENT DOCUMENTS

KR 102597357 B1 11/2023

OTHER PUBLICATIONS

The International Search Report and Written Opinion received in co-pending PCT application, having application No. PCT/US2025/014296 mailed on May 22, 2025.

(Continued)

*Primary Examiner* — Eric Yen

(57) ABSTRACT

A method for generating a hierarchical taxonomy relating to an interaction aspect from conversation data. The method includes a first process for generating insights that includes: receiving conversation data for a first interaction; determining a conversation portion relevant to the interaction aspect and a question prompt and providing them as inputs to an LLM; and generating responsive output text via the LLM as the first insight. In a second process, inputs are provided to the LLM that include the insights, a first instruction to generate category names based on the insights, and a second instruction to make a category assignment for each insight. The second process further includes receiving from the LLM the generated category names and category assignments; grouping the insights by those having the same category assignment; and generating a hierarchical taxonomy according to the groupings.

20 Claims, 6 Drawing Sheets

(56) References Cited

OTHER PUBLICATIONS

Chirag Shah et al.: "Using Large Language Models to Generate, Validate, and Apply User Intent Taxonomies", arxiv.org, Cornell University Library, 201 Olin Library Cornell University Ithaca, NY 14853. Sep. 14, 2023, XP091621633.

Maxim Vidgof et al.: "Large Language Models for Business Process Management: Opportunities and Challenges", arxiv.org, Cornell University Library, 201 Olin Library Cornell University Ithaca, NY 14853, Apr. 9, 2023, XP091480637.

Park Sang-Min et al.: "Root Cause Analysis Based on Relations Among Sentiment Words", Cognitive Computation, New York, N.Y. : Springer, US. vol. 13, No. 4, May 4, 2021 XP037526318.

* cited by examiner

METHODS AND SYSTEMS FOR GENERATING TAXONOMY ANALYTICS FOR ASPECTS OF CONTACT CENTER INTERACTIONS

BACKGROUND

The present invention generally relates to natural language processing and related analytics in the field of customer service and customer relations management via contact centers and associated cloud-based systems. More particularly, but not by way of limitation, the present invention pertains to automated systems and methods that leverage large language models to efficiently generate taxonomy analytics in relation to aspects of contact center interactions.

BRIEF DESCRIPTION OF THE INVENTION

The present invention includes a computer-implemented method for generating a hierarchical taxonomy relating to an interaction aspect from conversation data taken from interactions handled by a contact center. The conversation data for a given interaction is text of a conversation occurring within a given one of the interactions between a customer and an agent of the contact center. The method includes performing a first process to generate insights for inclusion in an insight dataset, with each insight relating to the interaction aspect for a given one of the interactions. When described in relation to an exemplary first interaction of the interactions from which a first insight of the insights is generated, the first process includes the steps of: receiving the conversation data of a conversation for the first interaction; determining a conversation portion of the conversation of the first interaction relevant to the interaction aspect; determining a question prompt given the interaction aspect; providing, as inputs to a large language model (LLM), the question prompt and the conversation portion, wherein the LLM is configured to receive the inputs and generate output text answering the question prompt given content provided in the conversation portion; and generating the output text via operation of the LLM with the generated output text being the first insight. The method further includes performing a second process in relation to a first insight batch, with the first insight batch having a collection of insights selected from the insight dataset. The second process includes providing inputs to the LLM that include the insights in the first insight batch, a first instruction to the LLM to generate category names covering the insights in the first insight batch based on the insights included therein, a second instruction to the LLM to make a category assignment for each of the insights in the insight batch. The category assignment assigns a given one of the insights to one of the generated category names. The second process further includes the steps of: receiving, in a response from the LLM given the inputs, the generated category names and the category assignments; grouping the insights in the insight batch by those having the same category assignment; and generating a hierarchical taxonomy according to the grouping of the insights such that the hierarchical taxonomy includes top categories labeled according to respective ones of the generated category names and each top category has grouped therein the insights assigned to the associated category name. The method further includes the steps of generating a visual representation of the hierarchical taxonomy for display as a user interface on a user device.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
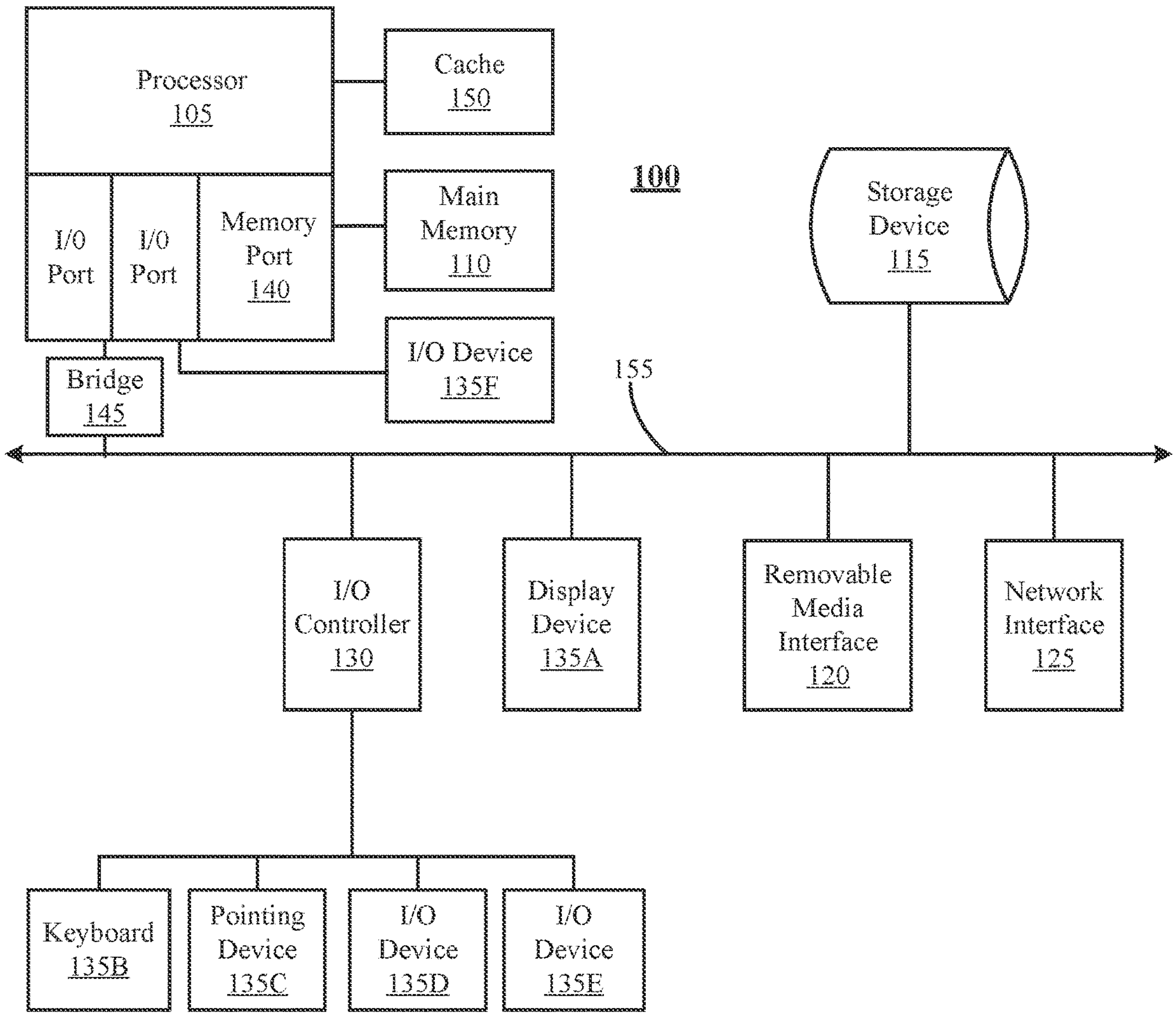
FIG. 1 depicts a schematic block diagram of a computing device in accordance with exemplary embodiments of the present invention and/or with which exemplary embodiments of the present invention may be enabled or practiced.

For the purpose of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 include a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. It should be understood that, unless otherwise limited, the computing device 100 may communicate with other computing devices 100 via any type of network using any conventional communication protocol. Further, the network may be a virtual network environment where various network components are virtualized.

Contact Center

Figure 2:
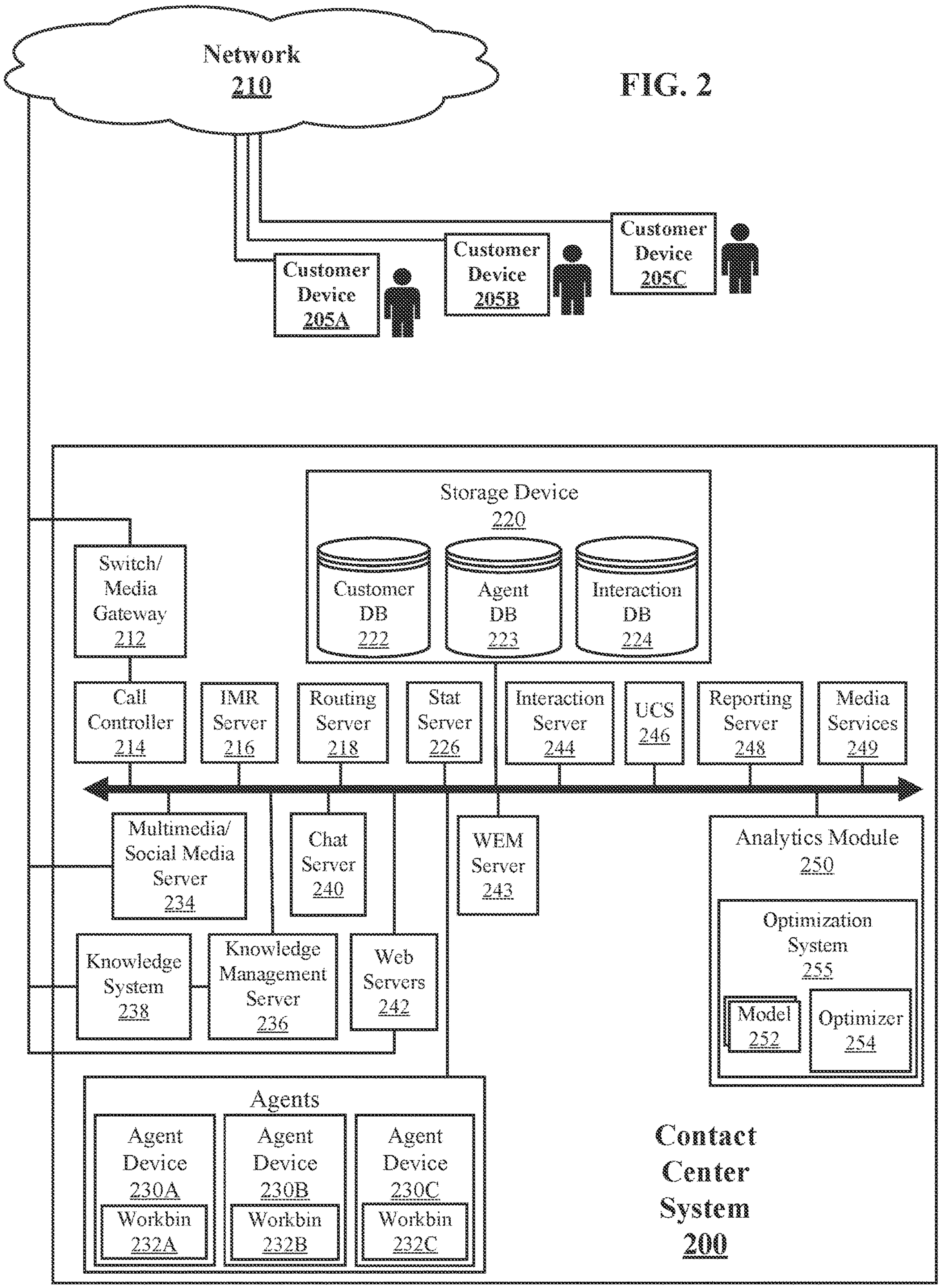
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize automated processes in place of live agents, such as, for example, interactive voice response (IVR) systems, interactive media response (IMR) systems, internet robots or "bots", automated chat modules or "chatbots", and the like.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VOIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This type of functionality may be referred to as predictive routing. Such agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VOIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like. The models 252 may include time series forecasting models as described in more detail below.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Hierarchical Taxonomy Analytics

The interactions that occur between customers and customer service agents provide data that is key to understanding contact center performance in delivering services. For example, the manner in which these interactions are conducted provides valuable insights into customer needs and preferences as well as agent performance. Much of the time these interactions between customer and agent occur over voice channels. In such cases, the contact center uses voice-to-text transcription to transcribe the customer-agent conversation. The text is then stored for analysis. With increasing frequency, contact center interactions are happening via text over digital channels, such as in a chat or messaging applications. The text that makes up these natural language customer-agent exchanges is then stored for analysis. While contact centers have proven to be effective at gathering such text data, the efficient analysis of the text remains a challenging proposition. Specifically, contact centers find it difficult to analyze this textual data in a timely and cost-effective manner while also teasing out the nuggets of operational intelligence that are often important to achieving performance goals.

One challenging aspect in analyzing this type of data is the sheer volume of it. With some contact centers regularly handling thousands of interactions daily, the amount of text that is generated for processing accumulates quickly. Compounding this problem is the nature of the data itself, which typically makes analysis time-consuming. Specifically, the textual data—whether it is transcribed voice conversations or taken from chat sessions—is derived from natural language conversations, and, because of this, is typically unstructured and noisy. Such text includes repetitions, hesitations, misspellings, grammatical incorrectness, tautologies, and other ambiguities that make effective analysis difficult. Though the degree to which this is true varies across the different communication channels—for example, text from chats may have less noise than that transcribed from voice recordings—these issues persist to a degree across all types of conversationally derived text.

Even so, contact center supervisors are expected to collect operational insights from these textual data sources and use these toward making day-to-day and long-term operational decisions. This type of data is regularly used to evaluate agent performance, hire new agents, spot unhappy customers, and, generally, alleviate recurring pain points for customers. Further, many emerging operational issues within contact centers are only identifiable early on because automated processes enable efficient organization and search of interaction data so that trends can become more easily spotted. Thus, even an incremental improvement as to how such data is processed and organized can have an outsized beneficial impact on contact center operations.

In looking further at the challenges contact centers face in this area, it can be helpful to first consider the many possible aspects that are applicable to customer-agent interactions. Such aspects—or, as used herein, "interaction aspects"—refer to the many characteristics that are generally used to describe and categorize interactions. This type of data can be used to group interactions by commonalities, and when such data is well-organized and timely, it can be leveraged by contact center supervisors to provides valuable insights.

There are many types of interaction aspects that can be studied. For example, one interaction aspect is customer intent that cover the reasons why customers initiate interactions, i.e., why customers contact customer service (e.g., to buy shoes, cancel a subscription, find out about clinical trials, etc.). Another interaction aspect relates to interaction resolution, i.e., characteristics describing how an interaction is resolved. There are also interaction aspects covering sentiment characteristics, for example, describing times within an interaction when a customer or agent expresses a positive or negative sentiment. Drilling down into this category, there are the different reasons as to why the sentiment was expressed, for example, why the customer was expressed a positive sentiment or, on the other side, what caused the customer to become aggravated so that they expressed a negative sentiment. As to the latter, there are many possible reasons for this, such as a poorly designed product, late shipping issues, or unprofessional behavior from the agent. Then there are different underlying reasons related to each of these reasons. For example, unprofessional agent behavior may be caused by a lack of knowledge or training about the product, unempathetic responses, use of informal language, or the agent being tired due to a long shift. Similar hierarchical lists could be fashioned around the other many interaction aspects, with the proliferation of categories within each hierarchy making it difficult for supervisors to stay informed, particularly with regard to new trends or emerging issues. If supervisors were more informed as to all the various emerging categories of the different interaction aspects, and if these categories could be presented in an ordered hierarchy that allowed easy drill-down (i.e., top-down exploration), then supervisors would become better at spotting developing issues and taking timely corrective actions. Further, supervisors would stay informed as to the relative size of categories found within a given interaction aspect. This enables a supervisor to select which of them to prioritize. For example, if "pricing" is the largest negative-sentiment-reason, and "trust" is a relatively small one, the supervisor can decide to focus on "pricing" first because it has more potential for improvement just due to its larger size. These sorts of insights, particularly when provided in a timely and cost-effective way, can be invaluable to efficient contact center management.

As described herein, methods and systems are proposed for automatically generating a hierarchical taxonomy (or simply, taxonomy) related to interaction aspects. As will be seen, the hierarchical taxonomy of the present invention is generated such that it allows efficient drilling down into narrowing categorical subject matter so that root problem solving is enabled. This drilling down may start at a top level of aspect category, include subcategories, and continue through to the level of specific interactions. Additionally, because example embodiments are powered by automated processes that leverage large language models to generate and shape the hierarchical taxonomies, the present invention is particular well-suited for handling the high volume demands associated with a contact center interactions.

Figure 3:
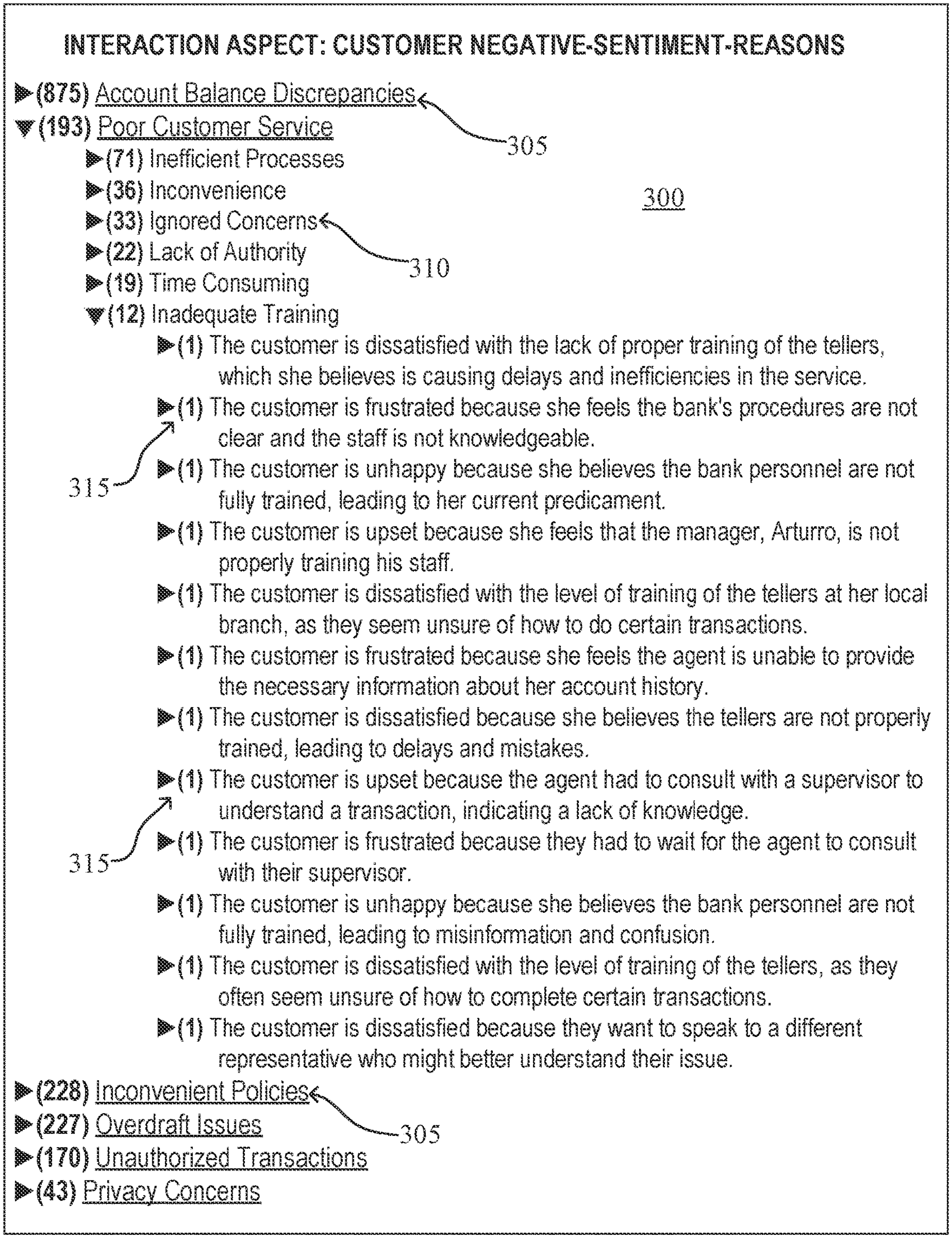
FIG. 3 is an exemplary hierarchical taxonomy in accordance with embodiments of the present disclosure.

With reference now to FIG. 3, an exemplary hierarchical taxonomy 300 is shown that is generated pursuant to present systems and methods. As shown, the hierarchical taxonomy 300 may be generated and shown as part of a user interface that can be explored via user inputs. In example embodiments, the hierarchical taxonomy 300 may be generated in relation to a particular interaction aspect, which, in the example of FIG. 3, is customer negative-sentiment-reasons, which refers to the reasons why customers express negative sentiment in an interaction. In exemplary embodiments, the hierarchical taxonomy may be configured in accordance with several hierarchical levels, including top aspect categories (or simply, top categories) 305, one or more levels of aspect subcategories (or simply, subcategories) 310 related to each of the aspect categories, and, as a final level, the interactions 315 themselves, which are grouped within each of the subcategories. As described below, the interactions may be configured to include an insight, such as a brief description, that is derived by an LLM from input text taken from the interaction. Thus, as shown, at the upper most level of the hierarchical taxonomy is a collection of top categories 305, which, in this example, provide the names given to the different broad groupings of reasons for negative customer sentiment. In the example, the top categories 305 include "Account Balance Discrepancies", "Poor Customer Service", "Inconvenient Policies", "Overdraft Issues", "Unauthorized Transactions", and "Privacy Concerns". A user can then drill down into the hierarchical taxonomy by clicking on the associated black arrows to expand the underlying subcategories 310 within a given top category 305. In this way, the top aspect categories 305 may each be shown in relation to the different aspect subcategories 310 that are found in each.

For example, "Poor Customer Service" is the label given to one of the top categories. When expanded, the "Poor Customer Service" top category shows several subcategories. The subcategories within the "Poor Customer Service" top category include "Inefficient Processes", "Inconvenience", "Ignored Concerns", "Lack of Authority", "Time Consuming", and "Inadequate Training". From there, each of the subcategories may similarly be expanded to reveal the interactions that are categorized in each. As shown in the illustrated example, the "Inadequate Training" subcategory has been expanded to show the twelve interactions that are included within it. In exemplary embodiments, the interactions are shown via a generated insight, which may be a brief description summarizing reasons found in the associated interaction. In accordance with exemplary embodiments, the insight or brief description is not content pulled directly from the interaction that it is derived from. As described below, the brief description may be automatically generated for each interaction, with the generation being based on the content of the interaction located around where the negative-sentiment is detected. For example, the negative sentiment may be detected by an automatic classification algorithm (e.g., finetuned Bert/Roberta neural network). In some embodiments, the interactions of the hierarchical taxonomy may further include a link to the actual interaction itself. In certain exemplary embodiments, the interaction 305 provides a clickable portion that, upon activation, takes the user to an interaction view page. The interaction view page, for example, may then provide content related to the interaction, including the actual text of the interaction, detected events occurring within the interaction (e.g., automatically spotted positive/negative utterances, the occurrence of predefined phrases, etc.), metadata such as interaction duration, agent name assigned to that interaction, and other information.

Within the hierarchical taxonomy 300, the numbers in the parentheses signify the size of the top category or subcategory, i.e., the number shown is the number of interactions grouped within each. Thus, for example, the "(193)" that is shown in relation to the top category of "Poor Customer Service" indicates that 193 interactions are grouped within the subcategories included therein. That is, within "Poor Customer Service" top category, there 193 interactions spread amongst the subcategories, with the amounts in each being indicated by the numbers in parentheses associated with the subcategories. Additionally, each level in the hierarchical taxonomy may be sorted by size in descending order, which focuses attention on the largest and most impactful categories (i.e., those that include the most interactions).

As stated, present systems and methods provide a cost-effective way for automatically generating the above-described hierarchical taxonomy given an input of text derived from natural language or conversational interactions. Attention will now turn to describing the process by which exemplary embodiments of the present invention do this. The general process steps will be discussed initially. While this discussion will continue to include examples focused on the interaction aspect of customer negative-sentiment-reasons, it should be understood that hierarchical taxonomies related to other interaction aspects may be generated using the same methodology.

As an initial step, the process of the present invention generally includes gathering interaction data from interactions being handled by the contact center. The interaction data may include conversation data, which, as used herein, is data related to a conversation between a customer and agent. The conversation may include a natural language exchange having multiple back and forth turns occurring between the agent and customer over the course of an interaction. The conversations may occur via a text interface, such as via a chat or messaging application. Conversations also may occur via a voice interface, such as via a telephone call or as part of a video conference. In the case of voice interface, the voice of the customer and agent may be recorded and then transcribed into text. This functionality is already performed at large scale in contact centers, with the transcribing of voice interactions being done automatically via a speech-to-text engine.

The present process may then continue with the step of detecting and gathering occurrences of the interaction aspect being analyzed (i.e., the interaction aspect for which the hierarchical taxonomy is being generated) in the collected conversation data. One type of interaction aspect may be referred to as sentiment-aspect, which, broadly, refers to the reason for the sentiment being expressed in an interaction. Accordingly, if the customer is upset, the sentiment-aspect is the reason as to why the customer is upset. As used herein, the customer negative-sentiment-reasons is a type of interaction aspect related to reasons explaining why a customer is upset or expresses negative sentiment in an interaction. To generate an exemplary hierarchical taxonomy related to customer negative-sentiment-reasons, the step of detecting and gathering occurrences of the interaction aspect may first proceed by detecting negative utterances in interactions that are made by the customer. Negative utterances are the utterances found to include a negative sentiment. The process of detecting negative utterances may also be referred to as sentiment analysis. Sentiment analysis may then be performed on the conversation text derived from interactions. As will be understood, sentiment analysis is an analytic process whereby text is analyzed to determine if the emotional tone of the message is positive, negative, or neutral. For example, sentiment analysis may be done using a pretrained classifier that classifies each utterance as one of: negative/positive/neutral. In exemplary embodiments, the pretrained classifier may be a LLM that includes a neural network that is first pretrained in an unsupervised manner on vast amounts of general text, which may be scrapped from the internet as described above from a range of sources. The pretrained classifier may be finetuned for the specific classification task, which in this case is classifying an utterance as one having a negative, positive, or neutral sentiment. For example, this training may be done using supervised (manually annotated) data. As an example, the Roberta model could be used as the pretrained classifier. The Roberta model is a neural network that uses the known transformer architecture with attention heads. As another example, a neural network known as XLMR may be used as a pretrained classifier. The XLMR model is similar to Roberta but has the advantage of being multilingual, i.e., the model is trained on many languages. In an exemplary embodiment, the text data derived from the interactions is supplied as an input to the large language model (LLM), such as Bert/Roberta, that is finetuned to act as a classifier of negative/neutral/positive utterances. The large language model then analyzes the text and spots instances of utterances made by the customer where the sentiment is evaluated as being negative. The results of the sentiment analysis, thus, identifies instances where the customer made a negative utterance.

In accordance with exemplary embodiments, the present process may continue by identifying a relevant portion of the conversation (or simply, conversation portion) in relation to the identified negative utterance. That is, for each of the spotted negative utterances, a relevant conversation portion is identified in relation to it and gathered for analysis. Such relevancy may be based on proximity within the conversation. For example, the relevant conversation portion may be defined as including the detected negative utterance and a predefined amount of the text surrounding the negative utterance. Thus, for each detected negative utterance, the relevant conversation portion may be identified as being the negative utterance and the utterances appearing around it. For example, in accordance with exemplary embodiments, a rule may be used to define a conversation portion as including a predetermined range of utterances made around the negative utterance, for example, a predetermined number of utterances made before the negative utterance (e.g., between 10 to 20 utterances before) and a predetermined number of utterances made after the negative utterance (e.g., between 5 to 10 after). Each line may start with a customer/agent notation identifying the speaker. The identification of relevant portions of the conversation (instead of using the complete conversation) for further analysis can significantly increase analytic efficiency. Of course, the present process can be performed in relation to the entire conversation (instead of just a portion) to the extent that analytic capacity is available. It should be understood that the manner in which relevant conversation portions are identified may vary depending upon the type of interaction aspect being analyzed. For example, the interaction aspect related to customer intent may focus on the beginning portion of the conversation, as this is where the customer generally expresses why they are calling. Thus, for customer intent, the determination of the relevant conversation portion may be according to rule identifying it as a predetermined number of utterances occurring at the beginning of the conversation. Whereas, in relation to the interaction aspect of the interaction resolution, the focus would be on the portion of the conversation toward the end of the interaction, as this is usually where resolutions are stated. In this case, the rule may be that the relevant conversation portion includes a predetermined number of utterances occurring at the end of the conversation.

The steps of detecting and gathering occurrences of an particular interaction aspect in the collected conversations and then identifying respective relevant conversation portions may continue until a desired number of samples is obtained. Such samples may be referred to herein as aspect samples. These collected aspect samples may be from a predefined type or selection of interactions, for example, those occurring in relation to a selected period of time or shift, those regarding a particular product line, or those handled by a particular agent or group of agents. The aspect samples may be collected until a threshold number is satisfied, at which point, the aspect samples may be grouped within an aspect sample dataset. In relation to the interaction aspect of customer negative-sentiment-reasons, each aspect sample stored within the aspect sample dataset may include the text corresponding to the conversation portion deemed relevant to a negative utterance by the customer. Each aspect sample may be stored so that it remains associated with the interaction from which it was derived.

The process of the present invention may continue by processing each of the aspect samples using a particularly instructed large language model (LLM). Specifically, the conversation portion of the aspect sample is provided as an input to LLM along with an instruction that asks the LLM to generate what will be referred to as an insight in relation thereto. In this case, the insight constitutes a brief description of the reasons for the customer's negative sentiment given the context provided in the conversation portion. Specifically, the conversation portion of the aspect sample is provided as an input to an LLM along with a particular question prompt related to the desired insight. In certain embodiments, an answer prefix may also be provided that describes a desired format for the answer. The question prompt may be referred to as an encoder prompt, while the answer prefix may be referred to as a decoder prompt.

In relation to the performance of this step in the process, a large language model or LLM is defined as a type of artificial intelligence (AI) algorithm that uses deep learning techniques and massively large datasets to understand, summarize, generate and predict new content. In exemplary embodiments, the LLM is one that is trained to take in text as an input and produce text as an output. Preferably, the LLM is trained and finetuned on specifical question answering and summarization style of text-to-text. In accordance with certain embodiments, the LLM that is used in this step is a language model having at least 1 billion parameters. Alternatively, the LLM may have at least 3 billion parameters. In other cases, the LLM of the present invention has at least 7 billion parameters. The LLM of the present invention may be constructed using the known transformer architecture, as either a decoder-only or encoder-decoder. The LLM may be trained using unsupervised data scrapped from the internet, with the objective of predicting the next word given all previous words in the context. The unsupervised data, for example, may be gathered from a wide range of sources, such as, Reddit chats, Wikipedia articles, books, etc. Such language models may have a limited context window, for example, 2048 tokens. If the text exceeds this limit, then only the last 2048 tokens are considered by the neural network model. For example, an LLM that may be used in this step is the T0++ (or TOPP) model. The TOPP model is an open source encoder-decoder LLM with a neural network having over eleven billion parameters. Other exemplary LLMs that could be used as part of the functioning of the present invention include other open source models as well as closed models. Llama 2 (a decoder-only model developed by Meta/Facebook), BTLM (developed by Cerebras), Pythia (developed by EleutherAI), and MPT (developed by Mosaiclm). Each of these models has between 1-7 billion parameters. In accordance with exemplary embodiments, the process of the present invention may include using an open source model, such as those identified, that is then further trained or finetuned on contact center data, for example, text from agent-customer interactions. Such LLMs can be trained pursuant to contact center data derived from within particular industries, companies, or other particularly defined contexts. Some examples of closed models that can be used with the present invention include GPT-3.5/4 (developed by OpenAI/Microsoft Azure), Claude (developed by Anthropic through Amazon Bedrock). While such close models typically cannot be further trained on a developer's own data, such models can be trained or finetuned on quantities of synthetic data that is provided by the model's developer. Other similar LLMs to those discussed above may also be used.

The text data—i.e., the conversation portion of the aspect sample—is fed into the LLM along with the question prompt and, if desired, an answer prefix. The LLM is then instructed to generate the desired insight (which may also be referred to as a brief description) based on the input text. As will be discussed in more detail below, the nature of the question prompt and the answer prefix depends upon the interaction aspect for which the hierarchical taxonomy is being generated. For example, in regard to the interaction aspect of customer negative-sentiment-reasons, the question prompt may be phrased, "Why is the customer upset?", while the answer prefix may be "The customer is upset because . . . ". As another example, when the interaction aspect is related to customer intent, the question prompt may be phrased, "What is the intent of the customer?", while the corresponding answer prefix may be "The intent of the customer is . . . ". And, in regard to the interaction aspect related to interaction resolution, the question prompt may be phrased, "How was the customer support conversation resolved?", while the corresponding answer prefix may be "The customer support conversation was resolved by . . . ". As will be appreciated, LLM, e.g. GPT-4) are getting increasingly better at understanding other types of instructions, including more complicated instructions that, for example, include a question and several conditions as to how the question should be answered. So, for example, in some embodiments, an instruction of the following type may be used: "Based on the customer support conversation above, what are the reasons for customer being upset? Use enumerated list notation. Write in third person. Be very concise. Use single short precise sentences per negative reason description." This type of instruction may produce more than one sentiment-reason, which is desirable if indeed there are several reasons in the same interaction snippet as to why the customer is upset.

In accordance with the instruction, the LLM generates text as an output given the described inputs. To do this, the LLM is asked to answer the question posed by the question prompt given the relevant conversation portion taken from the conversation. If an answer prefix is used, the LLM is further asked to generate the answer in a form consistent with the answer prefix. So, to continue the example, the LLM may be asked to generate all reasons as to why the customer is dissatisfied or upset. Generally, in regard to most interaction aspects—such as customer intent and interaction resolution—there is generally a single answer that is generated by the LLM per aspect sample (i.e., per conversation portion). However, there also may be secondary intents and secondary interaction resolutions in a given interaction. Thus, as part of this step, the LLM may be asked to generate all reasons as to why the customer is upset, thereby generating an insight that includes reasons. It should be understood that generating insights for different types of interaction aspects generally requires emphasis on particular portions of the conversation data and necessitates different question prompts and answer prefixes specific to the particular interaction aspect.

Figure 4:
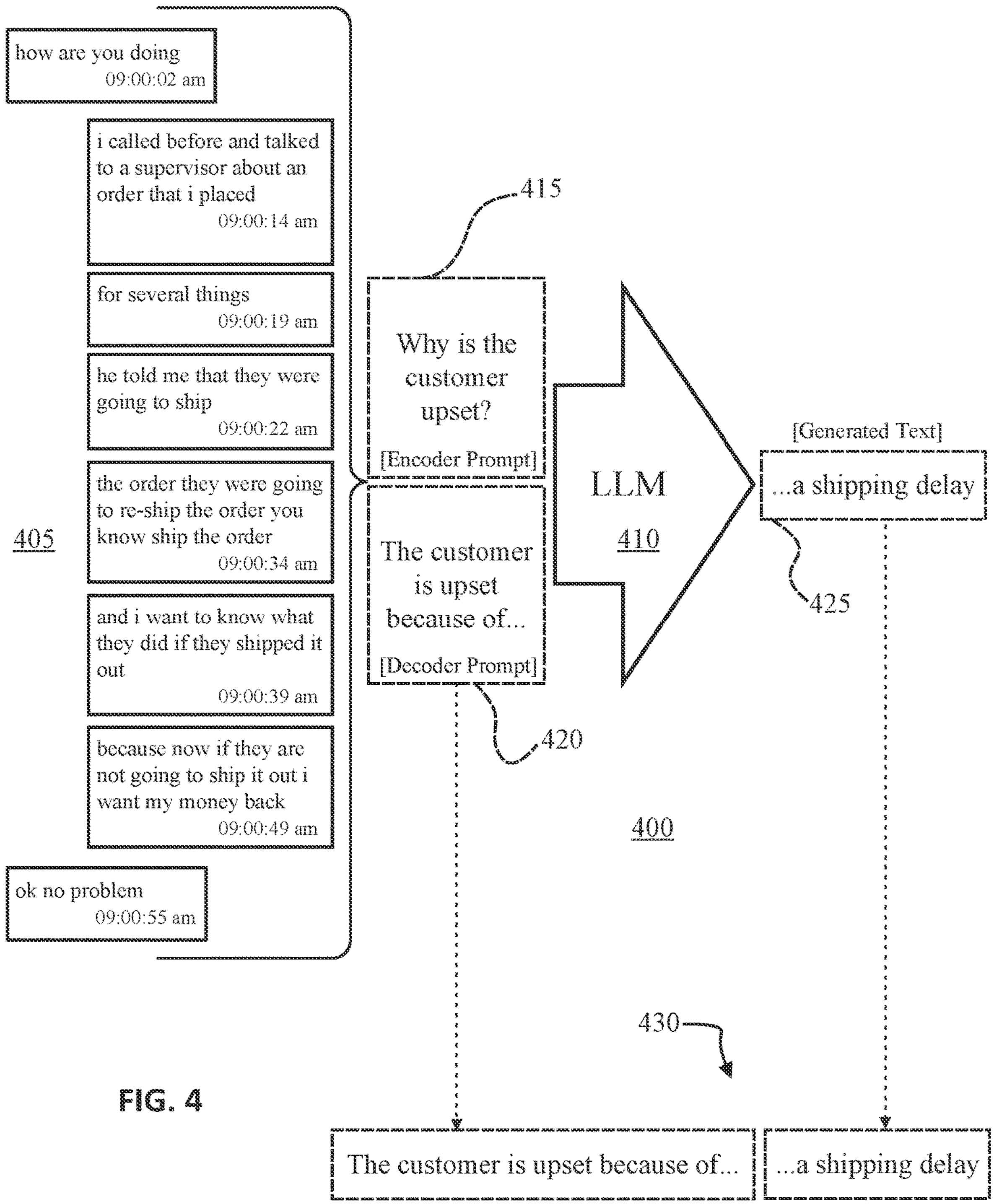
FIG. 4 is a simplified flow diagram demonstrating an exemplary process of generating insights from conversation data in accordance with embodiments of the present disclosure.

With reference now to FIG. 4, an example flow diagram 400 is provided that demonstrates further aspects as to how the process generates a particular insight. The illustrated example represents an actual result achieved with the inputs that are shown. On the left of the referenced figure, conversation data is shown that relates to a portion of a conversation (or "conversation portion") 405 that is derived from an text interaction between an agent and customer. The conversation portion 405 is provided via several blocks that are filled with the text exchanged during the interaction. The conversation portion 405 begins with a dialogue block in which the agent says, "How are you doing?". In the next several blocks, the customer proceeds with describing the reason for the call: "I called before and talked to a supervisor about an order that I placed . . . for several things . . . he told me that they were going to ship . . . the order they were going to reship the order you know ship the order . . . and I want to know what they did if they shipped it out . . . because now if they are not going to ship it out I want my money back." In the final dialogue block, the agent replies, "Ok no problem."

As already described, the conversation portion 405 may be a portion of the conversation that is identified as being relevant to the interaction aspect being analyzed. In the case of customer negative-sentiment-reasons, such relevancy of the conversation portion may stem from a determination that the customer expressed a negative sentiment within that portion. For example, in the case depicted, the determined negative sentiment may be the customer's utterance of "I want my money back". The relevant conversation portion may then be defined as the negative utterance and a predefined amount of text surrounding the negative sentiment. The conversation portion 405 is then provided as an input to an LLM 410 along with a question prompt 415 and, optionally, an answer prefix 420 (or encoder prompt and decoder prompt, respectively). Because the interaction aspect is customer negative-sentiment-reasons, the question prompt may be framed as "Why is the customer upset?" and the answer prefix may be framed as "The customer is upset because of . . . ". The answer prefix, which may also be omitted in some embodiments, basically informs the LLM as to the desired form of the answer that it generates. Given the inputs, the LLM then generates text that answers the question prompt in a form that completes the answer prefix. Thereby, a statement 430 is provided answering the question posed by the question prompt. In this case, the LLM generates" . . . a shipping delay" so to provide the statement 430 of "The customer is upset because of a shipping delay" as the generated insight.

In summary, the LLM is provided text from a natural language conversation as an input. The transcribed text may relate to a particular portion of the conversation that occurs within an interaction with that portion being identified as relevant to a particular interaction aspect. The LLM is further asked a question via a question prompt about the provided conversation portion text. Optionally, the answer may be conditioned in accordance with a provided answer prefix. The LLM then generates text that answers the question in the form of the answer prefix. In this case, as shown, the text generated by the LLM correctly identified the reason for the negative sentiment. The generated insight, which also may be referred to herein as a brief description, may be stored in association with the interaction from which it was derived and made available to the subsequent steps of the present process, as provided below.

In exemplary embodiments, the process for generating the insights (i.e., brief descriptions) continues in relation to the aspect samples contained within the aspect sample dataset. The generated insights are then selected for inclusion within batches, each of which will be referred to as an insight batch, for further processing.

An insight batch is a grouped bunch of insights. In accordance with exemplary embodiments, the selection of insights for inclusion within a particular insight batch is a random process so that the insights included within a particular batch are unrelated to each other. Depending on how the order of the above steps are performed, the random selection may occur at different points in the process to achieve this. The desired result is that the insights placed within a particular insight batch are ones that are derived from a random assortment of underlying interactions. Thus, in accordance with one possible embodiment, the insights within a particular insight batch may be generated from aspect samples randomly selected from available aspect samples within the aspect sample dataset. Alternatively, the insights could first be generated for the entirety of the aspect samples within the aspect sample dataset and stored within an insight dataset. The insights included within an insight batch could then be selected at random from the insight dataset. That is, the insights for inclusion within a particular insight batch could be randomly selected from the whole of the group of generated insights stored within the insight dataset.

An insight batch may contain a predetermined number of insights. Preferably, between approximately 50 and 100 insights is included within each insight batch. Thus, for example, in relation to the interaction aspect of customer negative-sentiment-reasons, each insight batch will include between 50 and 100 brief descriptions summarizing reasons for a negative sentiment expressed by a customer.

The present process then continues in relation to the insight batch. In the next step, the insight batch is provided as an input to the LLM with an instruction asking the LLM to generate a unique list of category names based on or inspired by the insights contained within the insight batch. Because the insights contained within the insight batch are derived from a random, unrelated assortment of interactions, the category names that the LLM creates will tend to be high-level, broad category names. This result is intended, and the reason why the insight batch is formed to include conversation portions from unrelated interactions, as it forces the LLM to differentiate and partition insights that are unrelated and, thus, cover a wide ranging set of reasons. This necessarily results in category names that are general in nature. The list of generated categories names may be referred to herein as a level-0 hierarchy.

In accordance with exemplary embodiments, the present process continues with additional instructions being provided to the LLM for completing another task. As one input for this task, the LLM is again provided with the insight batch that was used in the previous step. The other input is the category names generated in the previous step. With these inputs, the LLM is then instructed to generate category assignments for each of the insights included within the insight batch. In other words, the LLM is asked to assign each insight of the insight batch to one of the categories included in the list of generated category names.

In certain exemplary embodiments, the above two tasks are combined with a single instruction covering both. For example, an instruction to the LLM covering both tasks may be as follows: "Referring to the list of different brief descriptions of causes of customer dissatisfaction with General Example Corporation during interactions between customer care agents. First generate a list of category names for partitioning the given brief descriptions, write Unique Category Names:. Then use these category names from the list of category names, and assign each brief description in the list of brief descriptions to one of the category names by writing the category name without the brief description, write Category Assignments:. Use between one and three words per category name. The list of category names should be small."

The procedure described above in relation to the insight batch is then repeated for a next one of the insight batches, which may be referred to herein generally as "next insight batches", until all of the aspect samples have been processed. Each "next insight batch" is formed via a random selection of insights from those insights that have not already been used in another one of the batches. Alternatively, depending on how the above steps are ordered, the random selection could be in regard to available aspect samples (i.e., those that have not already been used to generate insights that were included in a previous insight batch). With this alternative, the randomly selected aspect samples would then be used to generate insights until the desired amount is available for grouping together as the next insight batch. Whichever the case, the processing of insight batches may continue, insight batch by insight batch, until each of the aspect samples of the aspect sample dataset has been used to generate an insight and, then, each of the generated insights is used a single time within one of the insight batches.

In exemplary embodiments, the processing of the initial insight batch proceeds as described above. Then, once that is complete, the processing of each "next insight batch" proceeds in the same manner with one exception. This exception is that, for each next insight batch, a current list of generated category names (as generated by all preceding insight batches) is used to seed the LLM when generating category names. Thus, in each next insight batch, the insights are provided to the LLM with an instruction asking the LLM to generate a unique list of category names based on or inspired by the insights contained within the next insight batch given a starting point (or "seeds") that consists of the category names contained in the current list of generated category names. In this way, the LLM starts with the current list of category names and determines if additional category names are needed given the insights contained within the next insight batch. This step of providing the current list of category names as seeds when processing each subsequent insight batches is key to the stability of the inventory of generated category names, as otherwise tautology category names would arise to contaminate the taxonomy and make it unworkable or, at minimum, more cumbersome. This round by round process of generating category names may be referred to as a rolling generation of category names. In each successive round, the LLM may add additional categories names to the current list of category names (i.e., that were used as seeds) if the insights contained within the next insight batch warrant such additional names or may keep the current list as it is.

From there, the processing of each next insight batch continues as described in relation to the initial insight batch. Specifically, within each successive round of batch processing, the LLM is instructed to generate category assignments for each of the insights included within the next insight batch. Specifically, the LLM is asked to assign each insight with the next insight batch to one of the categories included in the list of generated category names. In this way, each insight in the next insight batch becomes associated with a category name. Thus, when all of the rounds of batch processing is complete, each of the insights will be associated with one of the category names on the generated list. The insights can all then be grouped according to category name, with distinct buckets of insights being created in this way. The insights within each bucket are related to each other in that each was assigned to the same category name.

In accordance with exemplary embodiments, the present process then continues with the step of generating subcategory names. The subcategory names are the names given to subgroups identified in relation to the collection of insights collected within each buckets (i.e., the bucket interactions that were assigned the same category name). The process for generating subcategory names may be the same as that described above in regard to how the category names are generated. However, in this case, the LLM is not asked to generate category names for insights that are randomly selected and unrelated. Instead, for the subcategory names, the LLM is asked to generate partition names for insights that it has already grouped together. Thus, the LLM is compelled to further differentiate between insights (i.e., the brief descriptions) that it already found to be related to each other. This forces the LLM to create a finer-level granularity of partition names, which will serve as the subcategory names. The subcategory names that are generated in this step may be referred to herein as level-1 hierarchy. In cases where the level-1 hierarchy and level-0 hierarch category names are found to be the same (verbatim), the level-1 hierarchy to the partitions name can be modified to "other", which may be understood to stand for: "all brief descriptions that are in a certain high-level partition but are too different". Of course, if addition categorical distinction is desirable, the same processes can be used to create another level of names, which would constitute another level of subcategories, i.e., subcategories in relation to the initial level of subcategories. Such subcategory level may be referred to herein as level-2 hierarchy. Additional hierarchical levels, i.e., level-3 hierarchy, level-4 hierarchy, and so forth, can be generated to the extent further differentiation is needed in light of the complexity of the interaction aspect being studied.

In certain embodiments, seed category or subcategory names may be provided by human users at any point in the process. For example, a human user may want to intervene and provide one or more category names based on their external knowledge, phrasing preferences, or category preferences. For example, instead of "Account Balance Discrepancies" the terminology of "Account Balance Issues" may be preferred, or instead of "Call Inconvenience", there could be two category names such as "Poor Customer Service" and "Long Wait Times". In this case, the present system would automatically adapt and either generate the missing category names or assign the existing category names to the most closely related insights.

In accordance with the above process, a hierarchical taxonomy can be efficiently generated for any selection of interactions. For example, a selection of interactions may include those occurring during a particular day or week, those handled by a particular agent or group of agent, those handled within the last day, week, or month, those pertaining to a certain line of business, those lasting longer than 20 minutes, those that had at least 10 silences longer than 5 seconds, some combination of those, or any other filter-criteria. Once the selection of interactions is defined, they would be subject to the above processing so to generate a visual representative hierarchy, such as the one shown in FIG. 3. In certain embodiments, a user just needs to define a set of interactions to kickstart the process. Once this is done, the automated processes described above can then proceed toward the generating a representative hierarchical taxonomy. Question prompts and, optionally, answer prefixes, can be preconfigured for several types of interaction aspects so that a user is able to select a desired interaction aspect as the one that will be covered by the generated taxonomy. Once generated, the hierarchical taxonomy provides valuable insight into the chosen subject area. The hierarchical taxonomy can be shown in a user-interface with functionality that allows a supervisor to interact with the categories via expandable arrows, as described above. In this way, the supervisor is able to drill down into the data to decipher current performance trends and emerging problems.

The following is a simplified example of operation pertaining to the processes introduced above. The example begins at the point in the process where the batch of insights (which in this case are brief descriptions) becomes available. In this much-simplified example, the insight batch includes the just six brief descriptions:

Brief Description No. 1: The customer is bothered by the fact that despite not making a purchase and sending a letter to the bank, there is still a hold on his account.

Brief Description No. 2: The customer is confused about the bank's policy of holding the entire check amount until the funds can be verified.

Brief Description No. 3: The customer is unhappy because they feel the bank is not showing the correct amount in their accounts.

Brief Description No. 4: The customer is upset because their personal information was used without their consent to make an unauthorized purchase online.

Brief Description No. 5: The customer is annoyed because the bank charges her $30 even if she uses her account an hour before her regular deposit shows in the account.

Brief Description No. 6: The customer is dissatisfied because he feels the bank is unfairly charging him every month.

The insight batch is supplied to an LLM with, for example, the following task instruction:

Above is a list of different brief descriptions of reasons for customer dissatisfaction with their bank occurring during an interaction with a customer care agent. First generate a list of category names for partitioning the given descriptions, write Unique Category Names:. Then use these category names and for every brief description above write a category name only, without the description, write Category Assignments:. Use between one and three words for each per category name. The is of categories should be small.

In its response, the LLM generates the following five category names and then makes the following category assignments:

Category Names:
Unauthorized Transactions
Account Balance Discrepancies
Miscommunication
Inconvenient Policies
Unexpected Charges Category Assignments:
Brief Description No. 1: Inconvenient Policies
Brief Description No. 2: Miscommunication
Brief Description No. 3: Account Balance Discrepancies
Brief Description No. 4: Unauthorized Transactions
Brief Description No. 5: Unexpected Charges
Brief Description No. 6: Unexpected Charges Next, the insights having the same category assignment are grouped together. In this simplified example, the grouping results in one category bucket (i.e., Unexpected Charges) having two insights, which include Brief Description No. 5 "The customer is annoyed because the bank charges her $30 even if she uses her account an hour before her regular deposit shows in the account" and Brief Description No. 6 "The customer is dissatisfied because he feels the bank is unfairly charging him every month." In this limited example, each of the other category buckets would contain a single insight. In following iterations using other insight batches, the 5 category names generated here would be used as seeds. Additional category names may be generated and the insights in the next insight batches would further fill the category buckets as they are distributed per category assignment. Subcategories related to each bucket category would then be generated via the same process. Once the level-0 and level-1 hierarchies are complete (and additional levels if necessary), the hierarchical taxonomy can be efficiently constructed, displayed as a user interface on the screen of a user device, and interacted with by the user in accordance with the functionality described herein.

Figure 5:
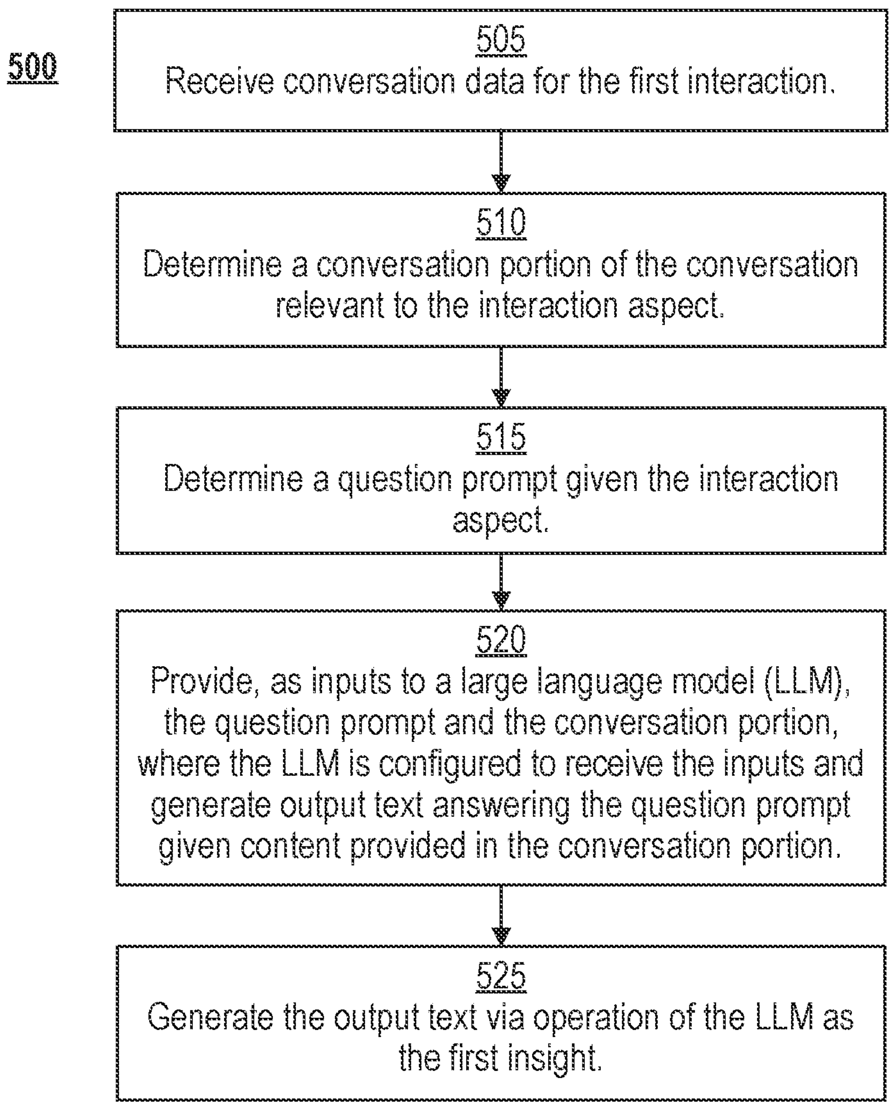
FIG. 5 is an exemplary process for generating insights related to an interaction aspect in accordance with embodiments of the present disclosure.
Figure 6:
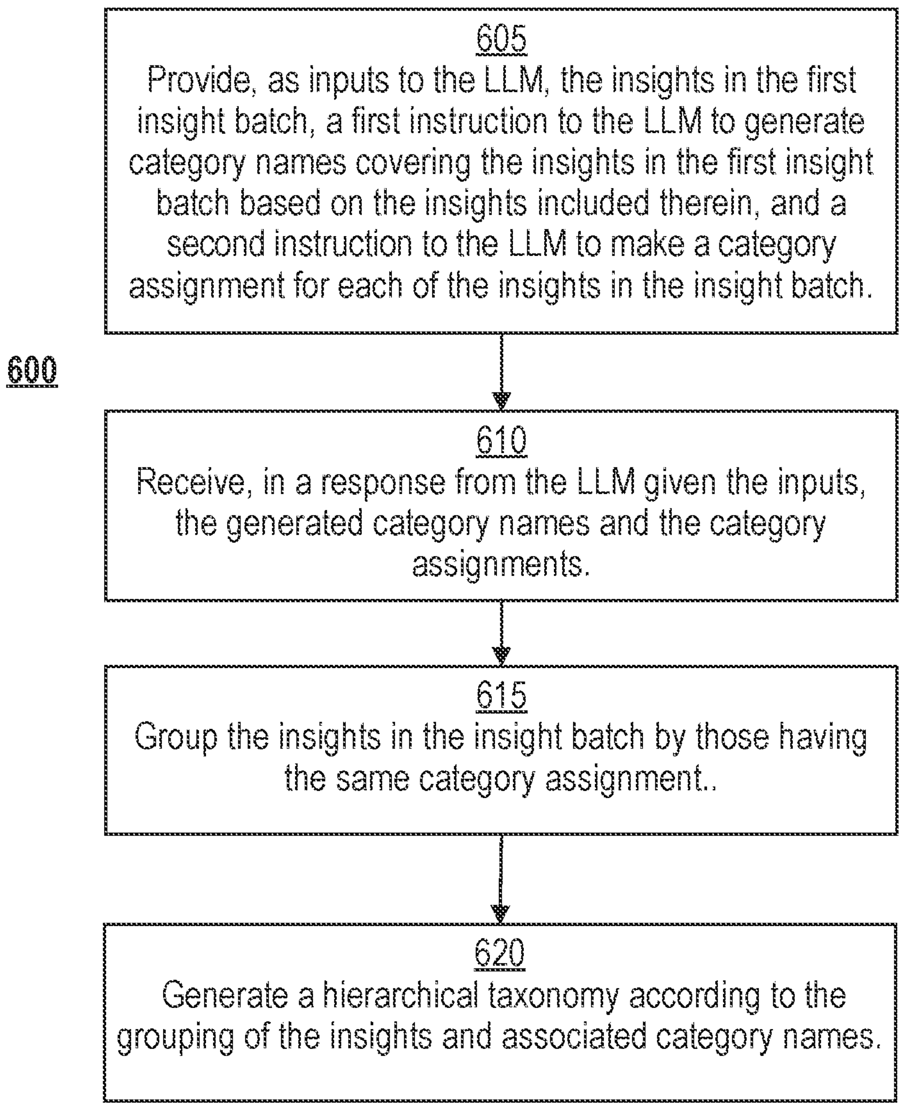
FIG. 6 is an exemplary process for generating category names and grouping insights for producing a hierarchical taxonomy in accordance with embodiments of the present disclosure.

With reference to FIGS. 5 and 6, an exemplary method is shown for generating a hierarchical taxonomy relating to an interaction aspect from conversation data taken from interactions handled by a contact center. As will be appreciated, the conversation data for a given interaction is text of a conversation occurring within a given one of the interactions between a customer and an agent of the contact center. In exemplary embodiments, the present method may include a step where a first process is performed, which is illustrated as a process 500 of FIG. 5. The first process (i.e., the process 500) is how insights are generated. The generated insights may then be stored within an insight dataset. In exemplary embodiments, the present method may further include a step where a second process is performed—which is illustrated as a process 600 of FIG. 6. The second process (i.e., the process 600) is performed in relation to an insight batch, which is a collection of insights taken from the insight dataset. The second process creates a grouping of the insights and generates the category names that form the basis of the hierarchical taxonomy. Once the steps associated with the first and second processes are completed, the present method may continue by producing a visual representation of the generated hierarchical taxonomy for display as a user interface on a user device.

With specific reference now to FIG. 5, the process 500 (which may also be referred to as the "first process") demonstrates the manner in which insights are generated. As will be appreciated, each insight relates to an interaction aspect for a given one of the interactions. When described in relation to an exemplary first interaction of the interactions from which a first insight of the insights is generated, the first process may include the following steps.

At step 505, the first process begins by receiving the conversation data of a conversation for the first interaction. The conversation data may include text transcribed from audio recording of the first interaction if it was handled over a voice communication channel. In other embodiments, the conversation data may include text from a messaging exchange.

At step 510, the first continues by determining a conversation portion of the conversation of the first interaction relevant to the interaction aspect. The interaction aspect, for example, may include customer intent, interaction resolution, sentiment-aspect, as well as others.

At step 515, the first process continues by determining a question prompt given the interaction aspect. The question prompt will depend on upon the type of interaction aspect being analyzed.

At step 520, the first process continues by providing, as inputs to a large language model (LLM), the question prompt and the conversation portion. The LLM may be configured to receive the inputs and generate output text answering the question prompt given content provided in the conversation portion.

At step 525, the first process continues by generating the output text via operation of the LLM. The generated output text is the first insight.

With specific reference now to FIG. 6, the process 600 (which may also be referred to as the "second process") demonstrates the manner in which the generated insights may be processes in batches so to generate category names and insight grouping, which then form the bases for the hierarchical taxonomy. The second process, thus, is performed in relation to an insight batch, which, in this example, may be referenced as a "first insight batch". The first insight batch may include a collection of insights that are selected from the insight dataset. The interactions from which the insights of the first insight batch are derived may be a set of interactions randomly selected from a larger set of interactions.

The second process begins, at step 605, by providing, as inputs to the LLM, the insights in the first insight batch, a first instruction to the LLM to generate category names covering the insights in the first insight batch based on the insights included therein, and a second instruction to the LLM to make a category assignment for each of the insights in the insight batch. As will be appreciated, the category assignment assigns a given one of the insights to one of the generated category names.

At step 610, the second process continues by receiving, in a response from the LLM given the inputs, the generated category names and the category assignments.

At step 615, the second process continues by grouping the insights in the insight batch by those having the same category assignment.

At step 620, the second process continues by generating a hierarchical taxonomy according to the grouping of the insights. More specifically, the hierarchical taxonomy is generated so to includes top categories labeled according to respective ones of the generated category names. Further, each top category has grouped therein the insights assigned to the associated category name.

In accordance with exemplary embodiments, the collection of insights included within the first insight batch is selected randomly from the insights stored within the insight dataset. A second insight batch may be selected from the insight dataset, where the second insight batch is another collection of insights randomly selected from among those insights of the insight dataset that were not selected for inclusion in the first insight batch.

In accordance with exemplary embodiments, subsequent to performing the second process in relation to the first insight batch, the second process is performed again in relation to the second insight batch. In performing the second process in relation to the second insight batch, the LLM may generate category names in relation to the second insight batch after being seeded with the category names that the LLM generated in relation to the first insight batch.

In accordance with exemplary embodiments, the present method may further include the step of performing a third process to generate subcategories relative to each of the top categories. When described in relation to an exemplary first top category of the top categories, the third process includes providing inputs to the LLM, where the inputs includes: the insights grouped within the first top category; a first instruction to the LLM to generate subcategory names covering the insights in the first top category based on the insights grouped therein; and a second instruction to the LLM to make a subcategory assignment for each of the insights grouped in the first top category. The subcategory assignment assigns a given one of the insights to one of the generated subcategory names. The third process then includes the steps of: receiving, in a response from the LLM given the inputs, the generated subcategory names and the subcategory assignments; further grouping the insights grouped in the first top category by those having the same subcategory assignment; and generating the hierarchical taxonomy according to the further grouping of the insights such that the hierarchical taxonomy comprises the first top category having subcategories labeled according to respective ones of the generated subcategory names and each subcategory has grouped therein the insights assigned to the associated subcategory name.

The visual representation of the hierarchical taxonomy may be generated for display on the user device so to include the top categories and the subcategories with each of the top categories. In exemplary embodiments, the step of generating the visual representation of the hierarchical taxonomy for display as the user interface may include selectively generating multiple different visual representations of the hierarchical taxonomy based on a first type of user input. For example, the first type of user input may activate a first icon disposed in spaced relation to at least one the top categories that toggles between an expanded view, in which the at least one of the top categories is expanded so that the subcategories included therein are shown, and a contracted view, in which the at least one of the top categories is contracted so that the subcategories included therein remain hidden. In exemplary embodiments, the selectively generating the multiple different visual representations of the hierarchical taxonomy may further be based on a second type of user input. The second type of user input activates a second icon disposed in spaced relation to at least one the subcategories that toggles between an expanded view, in which the at least one of the subcategories is expanded so that the insights included therein are shown, and a contracted view, in which the at least one of the subcategories is contracted so that the insights included therein remain hidden.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for generating a hierarchical taxonomy relating to an interaction aspect from conversation data taken from interactions handled by a contact center, wherein the conversation data for a given interaction comprises text of a conversation occurring within a given one of the interactions between a customer and an agent of the contact center, the method comprising the steps of:

performing a first process for generating insights for inclusion in an insight dataset, wherein each insight relates to the interaction aspect for a given one of the interactions, wherein, when described in relation to an exemplary first interaction of the interactions from which a first insight of the insights is generated, the first process comprises the steps of:

receiving conversation data of a conversation for the first interaction;

determining a conversation portion of the conversation for the first interaction relevant to the interaction aspect;

determining a question prompt given the interaction aspect;

providing, as inputs to a large language model (LLM), the question prompt and the conversation portion, wherein the LLM is configured to receive the inputs and generate output text answering the question prompt given content provided in the conversation portion;

generating the output text via operation of the LLM, the generated output text comprising the first insight;

performing a second process in relation to a first insight batch, the first insight batch comprising a collection of insights selected from the insight dataset, wherein the second process comprises the steps of:

providing further inputs to the LLM, wherein the further inputs to the LLM comprise:

the insights in the first insight batch;

a first instruction to the LLM to generate category names covering the insights in the first insight batch based on the insights included therein; and a second instruction to the LLM to make a category assignment for each of the insights in the first insight batch, wherein the category assignment assigns a given one of the insights in the first insight batch to one of the generated category names;

receiving, in a response from the LLM given the further inputs provided to the LLM, the generated category names and the category assignments;

grouping the insights in the first insight batch by those having the same category assignment; and generating the hierarchical taxonomy according to the grouping of the insights such that the hierarchical taxonomy comprises top categories labeled according to respective ones of the generated category names and each top category has grouped therein the insights assigned to the associated category name; and;

generating a visual representation of the hierarchical taxonomy for display as a user interface on a user device.

2. The method of claim 1, wherein the collection of insights included within the first insight batch is selected randomly from the insights stored within the insight dataset;

wherein a second insight batch is selected from the insight dataset, the second insight batch comprising another collection of insights randomly selected from among those insights of the insight dataset that were not selected for inclusion in the first insight batch;

wherein, subsequent to performing the second process in relation to the first insight batch, the second process is performed again in relation to the second insight batch.

3. The method of claim 2, wherein in performing the second process in relation to the second insight batch, the LLM generates category names in relation to the second insight batch after being seeded with the category names that the LLM generated in relation to the first insight batch.

4. The method of claim 3, further comprising the step of performing a third process to generate subcategories relative to each of the top categories, wherein, where described in relation to an exemplary first top category of the top categories, the third process comprises the steps of:

- providing additional inputs to the LLM, wherein the additional inputs to the LLM comprise:
  - the insights grouped within the first top category;
  - a first instruction to the LLM to generate subcategory names covering the insights grouped within the first top category; and
  - a second instruction to the LLM to make a subcategory assignment for each of the insights grouped within the first top category, wherein the subcategory assignment assigns a given one of the insights grouped within the first top category to one of the generated subcategory names;
- receiving, in a response from the LLM given the additional inputs, the generated subcategory names and the subcategory assignments;
- further grouping the insights grouped within the first top category by those having the same subcategory assignment; and
- regenerating the hierarchical taxonomy according to the further grouping of the insights such that the regenerated hierarchical taxonomy comprises the first top category having subcategories labeled according to respective ones of the generated subcategory names and each subcategory has grouped therein the insights assigned to the associated subcategory name;
- wherein a visual representation of the regenerated hierarchical taxonomy is generated for display on the user device so as to include the top categories and subcategories with each of the top categories.

5. The method of claim 3, wherein the step of generating the visual representation of the hierarchical taxonomy for display as the user interface comprises selectively generating multiple different visual representations of the hierarchical taxonomy based on a first type of user input;

- wherein the first type of user input activates a first icon disposed in spaced relation to at least one of the top categories that toggles between an expanded view, in which the at least one of the top categories is expanded so that subcategories included therein are shown, and a contracted view, in which the at least one of the top categories is contracted so that the subcategories included therein remain hidden.

6. The method of claim 5, wherein the selectively generating the multiple different visual representations of the hierarchical taxonomy is further based on a second type of user input;

- wherein the second type of user input activates a second icon, disposed in spaced relation to at least one of the subcategories included therein, that toggles between an expanded view, in which the at least one of the subcategories included therein is expanded so that insights included therein are shown, and a contracted view, in which the at least one of the subcategories included therein is contracted so that the insights included therein remain hidden.

7. The method of claim 3, wherein the LLM comprises a neural network model having at least 1 billion parameters that is configured to take in text as an input and produce text as an output; and

- wherein the conversation data taken from interactions handled by the contact center comprises text transcribed from audio recordings of interactions handled over a voice communication channel.

8. The method of claim 3, wherein the LLM comprises a neural network model having at least 3 billion parameters that is configured to take in text as an input and produce text as an output; and

- wherein the LLM comprises an open source LLM;
- further comprising the step of providing refinement training to the LLM pursuant to a historical dataset of the contact center, the historical dataset comprising conversation data derived from interactions previously handled by the contact center.

9. The method of claim 1, wherein the insights generated from the first process are derived from a set of interactions randomly selected from a larger set of interactions; and

- wherein in performing the second process in relation to the insights generated from the first process, the LLM generates category names in relation to the insights generated from the first process after being seeded with one or more category names received as an input from a user.

10. The method of claim 3, wherein the interaction aspect comprises a customer sentiment-aspect related to why the customer expresses a negative utterance in an interaction;

- wherein the step of determining the relevant conversation portion to the interaction aspect comprises:
  - performing, using a pretrained classifier model, sentiment analysis on the conversation for the first interaction, the pretrained classifier model comprising a neural network configured to classify utterances as being a positive utterance, negative utterance, or neutral utterance;
  - identifying, via the sentiment analysis, an utterance made by the customer that is classified as a negative utterance;
  - determining the relevant conversation portion in relation to proximity to the utterance made by the customer by defining the relevant conversation portion as including the utterance made by the customer, a predetermined number of utterances occurring in the conversation for the first interaction just prior to the utterance made by the customer, and a predetermined number of utterances occurring in the conversation for the first interaction just after the utterance made by the customer.

11. The method of claim 10, wherein the second insight batch comprises a brief description of one or more reasons explaining why the customer expressed the negative utterance in the interaction.

12. The method of claim 3, wherein the interaction aspect comprises a customer intent;

- wherein the step of determining the relevant conversation portion to the interaction aspect comprises defining the relevant conversation portion as including a predetermined number of utterances occurring just after a beginning of the conversation for the first interaction.

13. The method of claim 3, wherein the recite-interaction aspect determined for the first insight comprises an interaction resolution;

- wherein the step of determining the relevant portion of the conversation for the first interaction comprises defining the relevant conversation portion as including a predetermined number of utterances occurring just prior to an end of the conversation for the first interaction.

14. A system for generating a hierarchical taxonomy relating to an interaction aspect from conversation data taken from interactions handled by a contact center, wherein the conversation data for a given interaction comprises text of a conversation occurring within a given one of the interactions between a customer and an agent of the contact center, the system comprising:

a processor;

a large language model (LLM), and a memory storing instructions which, when executed by the processor, cause the processor to execute the steps of:

performing a first process for generating insights for inclusion in an insight dataset, wherein each insight relates to the interaction aspect for a given one of the interactions, wherein, when described in relation to an exemplary first interaction of the interactions from which a first insight of the insights is generated, wherein the first process comprises the steps of:

receiving conversation data of a conversation for the first interaction;

determining a conversation portion of the conversation for the first interaction relevant to the interaction aspect;

determining a question prompt given the interaction aspect;

providing, as inputs to the LLM, the question prompt and the conversation portion, wherein the LLM is configured to receive the inputs and generate output text answering the question prompt given content provided in the conversation portion;

generating the output text via operation of the LLM, the generated output text comprising the first insight;

performing a second process in relation to a first insight batch, the first insight batch comprising a collection of insights selected from the insight dataset, wherein the second process comprises the steps of:

providing further inputs to the LLM, wherein the further inputs to the LLM comprise:

the insights in the first insight batch;

a first instruction to the LLM to generate category names covering the insights in the first insight batch based on the insights included therein; and a second instruction to the LLM to make a category assignment for each of the insights in the first insight batch, wherein the category assignment assigns a given one of the insights in the first insight batch to one of the generated category names;

receiving, in a response from the LLM given the further inputs provided to the LLM, the generated category names and the category assignments;

grouping the insights in the first insight batch by those having the same category assignment; and generating the hierarchical taxonomy according to the grouping of the insights such that the hierarchical taxonomy comprises top categories labeled according to respective ones of the generated category names and each top category has grouped therein the insights assigned to the associated category name; and;

generating a visual representation of the hierarchical taxonomy for display as a user interface on a user device.

15. The system of claim 14, wherein the collection of insights included within the first insight batch is selected randomly from the insights stored within the insight dataset;

wherein a second insight batch is selected from the insight dataset, the second insight batch comprising another collection of insights randomly selected from among those insights of the insight dataset that were not selected for inclusion in the first insight batch;

wherein, subsequent to performing the second process in relation to the first insight batch, the second process is performed again in relation to the second insight batch.

16. The system of claim 15, wherein in performing the second process in relation to the second insight batch, the LLM generates category names in relation to the second insight batch after being seeded with the category names that the LLM generated in relation to the first insight batch.

17. The system of claim 16, wherein the memory stores further instructions which, when executed by the processor, cause the processor to execute the step of:

performing a third process to generate subcategories relative to each of the top categories, wherein, where described in relation to an exemplary first top category of the top categories, the third process comprises the steps of:

providing additional inputs to the LLM, wherein the additional inputs to the LLM comprise:

the insights grouped within the first top category;

a first instruction to the LLM to generate subcategory names covering the insights grouped within the first top category; and a second instruction to the LLM to make a subcategory assignment for each of the insights grouped within the first top category, wherein the subcategory assignment assigns a given one of the the insights grouped within the first top category to one of the generated subcategory names;

receiving, in a response from the LLM given the additional inputs, the generated subcategory names and the subcategory assignments;

further grouping the insights grouped within the first top category by those having the same subcategory assignment; and regenerating the hierarchical taxonomy according to the further grouping of the insights such that the regenerated hierarchical taxonomy comprises the first top category having subcategories labeled according to respective ones of the generated subcategory names and each subcategory has grouped therein the insights assigned to the associated subcategory name;

wherein a visual representation of the regenerated hierarchical taxonomy is generated for display on the user device so as to include the top categories and subcategories with each of the top categories.

18. The system of claim 16, wherein the step of generating the visual representation of the hierarchical taxonomy for display as the user interface comprises selectively generating multiple different visual representations of the hierarchical taxonomy based on a first type of user input;

wherein the first type of user input activates a first icon disposed in spaced relation to at least one of the top categories that toggles between an expanded view, in which the at least one of the top categories is expanded so that subcategories included therein are shown, and a contracted view, in which the at least one of the top categories is contracted so that the subcategories included therein remain hidden.

19. The system of claim 18, wherein the selectively generating the multiple different visual representations of the hierarchical taxonomy is further based on a second type of user input;

wherein the second type of user input activates a second icon, disposed in spaced relation to at least one of the subcategories included therein, that toggles between an expanded view, in which the at least one of the subcategories included therein is expanded so that insights included therein are shown, and a contracted view, in which the at least one of the subcategories included therein is contracted so that the insights included therein remain hidden.

20. The system of claim 17, wherein the LLM comprises a neural network model having at least 3 billion parameters that is configured to take in text as an input and produce text as an output;

wherein the interaction aspect comprises a customer sentiment-aspect related to why the customer expresses a negative utterance in an interaction; and wherein the step of determining the relevant conversation portion to the interaction aspect comprises:

performing, using a pretrained classifier model, sentiment analysis on the conversation for the first interaction, the pretrained classifier model comprising a neural network configured to classify utterances as being a positive utterance, negative utterance, or neutral utterance;

identifying, via the sentiment analysis, an utterance made by the customer that is classified as a negative utterance;

determining the relevant conversation portion in relation to proximity to the utterance made by the customer by defining the relevant conversation portion as including the utterance made by the customer, a predetermined number of utterances occurring in the conversation for the first interaction just prior to the utterance made by the customer, and a predetermined number of utterances occurring in the conversation for the first interaction just after the the utterance made by the customer.

* * * * *